3,112,257
PROCESS FOR THE CATALYTIC DESULFURIZATION OF HYDROCARBON OILS
Cornelis T. Douwes, Pieter A. van Weeren, and Hendrikus de Ruiter, Amsterdam, Netherlands, assignors to Shell Oil Company, New York, N.Y., a corporation of Delaware
No Drawing. Filed Mar. 7, 1961, Ser. No. 93,881
Claims priority, application Great Britain Mar. 9, 1960
10 Claims. (Cl. 208—216)

This invention relates to a process for the catalytic desulfurization of hydrocarbon oils by contacting sulfur-containing hydrocarbon oils at elevated temperature in the presence of water vapor with a hydrogenation/dehydrogenation catalyst.

It is known to desulfurize hydrocarbon oils by contacting these oils with a catalyst in the presence of hydrogen at elevated temperature and pressure. The drawback of this hydrodesulfurization is that it requires hydrogen.

It has been proposed that the hydrogen required be produced by passing in a preceding stage the hydrocarbon oil to be desulfurized at a temperature above 450° C. together with steam over a catalyst. The hydrogen formed by the reaction of the hydrocarbon oil with steam is then used in a second step for the desulfurization at a temperature below 450° C. This procedure in two stages has the disadvantage that for the desulfurization two separate reactors are needed which are operated at different temperatures.

It has been proposed also to carry out the catalytic desulfurization of hydrocarbon oils without making use of free hydrogen, by passing the hydrocarbon oils over a hydrogenating/dehydrogenating catalyst in the presence of water vapor at a temperature between 350 and 450° C. A technical and economic drawback of this process is, however, that there is usually a rapid decline in the activity of the catalyst, as a result of which it has to be regenerated after only a short period.

It is an object of this invention to provide an improved desulfurization process. It is another object of the invention to provide a desulfurization process not involving injection of free hydrogen. A further object is the desulfurization of hydrocarbon oils in the presence of water vapor with a hydrogenation/dehydrogenation catalyst which contains a stabilizing agent for improved catalyst life. Other objects will become apparent during the following description of the invention.

Now, in accordance with this invention, a process for the catalytic desulfurization of hydrocarbon oils has been found which comprises contacting these hydrocarbon oils at an elevated temperature with a catalyst containing at least one sulfide of an element of the left-hand column of group VI of the periodic table and at least one sulfide of the iron group metals of group VIII, i.e. iron, nickel and cobalt, and containing one or more alkali metal compounds, which process is characterized in that the hydrocarbon oil is passed over the catalyst at superatomospheric pressure and at a temperature in the range of 250° C. to 450° C., in the presence of steam, the said catalyst being supported on a carrier consisting wholly or partly of alumina. The presence of steam has been found to materially improve conversion and removal of heterocyclic sulfur compounds. The presence of the alkali metal compound improves catalyst stability and thereby provides longer catalyst life.

The catalytically active metal components are supported on a carrier wholly or partially consisting of alumina. Suitable carriers are, for example, natural and/or synthetic alumina-containing materials. These materials may also contain silica. The alumina content of the carrier may vary within wide limits. The carrier may, for example, contain between 5 to 95% by weight of alumina. Carriers having a high alumina content, for example 90% by weight or more, are preferred.

Particularly suitable are desulfurization catalysts comprising alumina as a carrier and 5–15% by weight of cobalt and molybdenum, the atomic ratio of cobalt to molybdenum being in the range of from 1:20 to 18:20, preferably from 1:10 to 9:10. Such catalysts are well known and are available commercially.

According to the invention the above catalysts are used in combination with one or more alkali metal compounds. Particularly suitable alkali metal compounds are the carbonates and/or compounds, e.g. hydroxides which are readily converted into the corresponding carbonates. This conversion may be effected by a separate pretreatment with carbon dioxide and/or by a conversion during the actual desulfurization process. In the latter case it will usually be unnecessary to add carbon dioxide to the starting material since desulfurization is accompanied by the formation of carbon dioxide. The alkali metal carbonates may also be obtained by starting from such organic salts as formates and acetates. In the conventional preparation of catalysts a calcination is generally carried out in the presence of air, the organic salts then being converted into the corresponding carbonates.

The alkali metal compounds are used in amounts from 10–80% by weight (calculated as carbonates) of final catalyst. Amounts of more than 15% by weight, particularly from 20 to 40% by weight, are usually preferred.

The alkali metal compounds are not necessarily equivalent in their ability to provide active and stable catalysts. Of the alkali metal compounds, those of lithium, sodium and potassium are preferred with those of lithium and sodium particularly preferred, to provide active and stable catalysts since the deactivating effect of sodium and lithium carbonate is far less pronounced than that of potassium carbonate.

The alkali metal compounds can be incorporated in the catalyst in various ways. As a rule the conventional catalyst preparation may be followed. Thus, for example, an impregnation method may be used in which carrier material is impregnated with a solution containing a mixture of one or more salts of catalytically active metals and of the alkali metal compound or compounds. The impregnated material is then dried and calcined, the salts being converted into the corresponding metal oxides and/or carbonates. The catalyst is then sulfided in a known manner, e.g. by passing over the catalyst a mixture of hydrogen and hydrogen sulfide, carbon disulfide, butylmercaptan, and the like.

It is preferred to mix the various components by mechanical means, such as by dry mixing. Good catalysts can be obtained, for example, by fine milling of a cobalt-molybdenum catalyst supported on alumina and mixing the powder obtained with a powdery alkali metal compound such as anhydrous soda. The resultant mixture, after the addition of a lubricant such as stearic acid or graphite, is compressed into pellets which can be calcined, such as in the presence of air at temperatures in the range from 100° to 800° C., preferably from 400–600° C. Lower calcination temperatures are preferred and, if desired, calcination can be obviated in the preparation of the present catalyst.

Further it has been found unnecessary to combine the Co—Mo—$Al_2O_3$ catalyst and the alkali carbonate into one composite pellet. The same favorable results can be obtained by carrying out the desulfurization in the presence of a mixture of Co—Mo—Al₂O₃ catalyst particles and particles of alkali carbonate and/or particles of e.g. a carrier material, as for instance alumina, containing the required amount of alkali carbonate.

Use of the catalyst in the form of fine particles may cause undesirable pressure drop in fixed bed operations. Therefore, catalysts prepared by mixing dry alkali carbonate powders with powdered Co—Mo—Al₂O₃ catalyst, and pelleting this mixture, are preferred.

In preparing the present catalyst by dry mixing the various components, the particle size of the powdery components is an important factor. As a general rule, catalysts prepared from particles smaller than about 30 mesh (ASTM standard sieves) are more active than those prepared from coarser powders. With potassium carbonate, however, coarse particles, i.e. 30–50 mesh or larger, should be used. Although the alkali metal compounds exert a favorable influence on stability of the catalytic activity in the present process, they do have a deactivating influence on Co—Mo catalysts. The deactivating effect of potassium carbonate appears to be far more pronounced than that of the sodium and lithium carbonates. Therefore, it is presumed that if potassium carbonate of too fine a particle size is used, the contact surface with the Co—Mo catalyst becomes so large that the deactivating effect predominates over the stabilizing effect.

The process according to the invention is suitable for the desulfurization of hydrocarbon oils such as gasolines, kerosenes, gas oils, lubricating oils and residual oils which may contain sulfur compounds of widely divergent composition. Both the acyclic sulfur compounds such as mercaptans, sulfides and disulfides, which are generally more readily affected, and also the more stable cyclic sulfur compounds such as thiophene, benzothiophene and the derivatives thereof are converted in the process according to the invention.

In addition to the above advantages of the process according to the invention the great selectivity of the desulfurization merits special mention. By this is meant that the feedstock to be desulfurized practically only the sulfur-containing molecules are affected, the hydrocarbon molecules remaining intact. Thus, starting from a mixture of benzene and thiophene, for example, practically only thiophene is decomposed in the process of the present invention.

The process is preferably carried out continuously. The liquid hourly space velocity can vary within wide limits. Liquid hourly space velocities between 0.25 and 4 kg. of oil per liter of catalyst per hour are preferably employed.

The ratio of the molar amounts of steam and hydrocarbon oil is determined, inter alia, by the sulfur content of the oil. Generally, 5 to 250 gram mols of steam are used per gram atom of sulfur in the feed.

The desulfurization reaction may be carried out in the vapor phase, the liquid phase, or partly in the vapor and partly in the liquid phase, depending on the feedstock which is to be desulfurized and the operating conditions. The pressure applied should be above atmospheric and is usually between 20 and 100 atm. abs. or higher, pressures in the range of from 50 to 75 atm. abs. being preferred. The higher pressures have a beneficial effect on the stability of the present catalyst. For practical reasons, pressures employed in commercial practice will generally not exceed 100 atm. abs.

The process of the present invention is carried out at temperatures in the range from 250° to 450° C. and preferably from 375°–425° C. At these temperatures, hardly any free hydrogen is formed. Larger amounts of hydrogen are produced only at temperatures above 450° C., a rapid increase in hydrogen yield being obtained with increasing temperature. Although the presence of free hydrogen in itself apparently is not detrimental and may even be favorable, the higher temperatures are to be avoided. The higher temperatures result in a relatively high decomposition of the feed as well as a rapid deactivation of the catalyst, e.g. by coke deposition. Moreover, at high temperatures, such as 600° C., and in the presence of steam, decomposition of the various components of the catalyst and/or sintering of the catalyst may occur.

Since desulfurization in the present process is effected in the presence of steam with no appreciable formation of hydrogen, the desulfurization mechanism is considered to be of an altogether different nature than by direct conversion with hydrogen as obtained in conventional processes. The present conversion is presumably through some form of hydrolysis in which the OH— group of the water takes the place of the sulfur atom bound to the carbon atom and the free valence of the sulfur atom so released is saturated by the remaining hydrogen atom of the water molecule.

This theory of a different mechanism is supported by the experiments from which it appears that the desulfurization of hydrocarbon oils in the presence of a Co—Mo—Al₂O₃-catalyst with the aid of hydrogen is unfavorably affected if the catalyst also contains an alkali metal compound. By contrast, if the same alkali metal containing catalyst is used with steam instead of hydrogen the desulfurization is greatly improved.

The catalyst may be used in a fluidized or suspended state, but a fixed bed of catalyst is preferred. Owing to the comparatively low reaction temperatures it is also possible for the hydrocarbon oils to be wholly, or practically wholly, in the liquid phase during the desulfurization without the need for excessively high pressures. For carrying out the desulfurization in the liquid phase the trickle technique is particularly suitable; in this the hydrocarbon oil is passed over the catalyst wholly or partly in the liquid phase together with the water vapor.

Although the desulfurization according to the process of the invention can be effected without a supply of hydrogen, a certain amount of hydrogen or hydrogen-containing gas, which in itself is insufficient for the desulfurization envisaged, may be added, if desired, to the water vapor supplied.

The process according to the invention is illustrated by the following examples.

EXAMPLE I

Technical xylene contaminated with about 10% by volume of thiophene, the mixture having a sulfur content of 4.4% by weight, was continuously introduced into the top of a column provided with a fixed catalyst bed, at a temperature of 400° C. and a pressure of 20 atm. abs. together with water vapor. The liquid hourly space velocity was 0.44 liters of liquid oil feed per liter of catalyst per hour and the ratio of water vapor to oil feed was 0.2 kg. per liter (9 gram mols of H₂O per gram atom sulfur). Reaction gases were cooled at the bottom of the column and the liquid and gaseous components separated.

The base catalyst used was a commercial cobalt-molybdenum catalyst supported on alumina and containing 3.9% of cobalt oxide, 12.6% of molybdenum oxide, the remainder being alumina. Starting from this catalyst a number of catalysts of varying contents of sodium carbonate were prepared. To this end the Co—Mo catalyst was mixed in powder form with the required amounts of likewise powdery sodium carbonate and then compressed into 3 x 3 mm. pellets after the addition of 1% by weight of stearic acid. The powdery components passed a 40 mesh sieve (ASTM standard sieves). The pellets were calcined in the presence of air for three hours at 500° C. in a muffle furnace. Finally, the catalysts were sulfided by contacting them with a mixture of hydrogen containing 10% by volume of hydrogen sulfide at atmospheric pressure and temperatures from 100°–350° C.

The percent desulfurization obtained with each catalyst after an operating period of 4–6 and 22–24 hours is listed in the following Table I.

*Table I*

EFFECT OF SODIUM CARBONATE ON ACTIVITY AND STABILITY OF COBALT MOLYBDATE DESULFURIZATION CATALYSTS

| Experiment No. | Catalyst Composition, parts by wt. | | Percent Desulfurization | |
|---|---|---|---|---|
| | Co-Mo-Al$_2$O$_3$ | Sodium Carbonate | After 4–6 hours | After 22–22 hours |
| 1 | 100 | | 85 | 54 |
| 2 | 99 | 1 | 83 | 57 |
| 3 | 95 | 5 | 91 | 67 |
| 4 | 90 | 10 | 81 | 74 |
| 5 | 75 | 25 | 96 | 96 |
| 6 | 50 | 50 | 89 | 91 |
| 7 | 25 | 75 | 65 | 62 |

By desulfurization percentage it is meant the result of $$\frac{\text{Percent S in feed} - \text{percent S in reaction product}}{\text{percent S in feed}} \times 100\%$$

The stability of the catalyst is found from the difference between the desulfurization percentages after 4–6 hours and 20–24 hours. The smaller this difference the greater is the stability. It is found that in the presence of 10% by weight of sodium carbonate in the catalyst a noticeable improvement in the stability already occurs, and that there is no decline in the activity at all with 25% by weight. The catalyst with 50% by weight of sodium carbonate showed even an increased activity after 20–24 hours, whereas with very high concentrations (75% by weight), desulfurization activity is low and a slight decline in the stability was observed. It should be noted that the original activity of the catalyst, as reflected by the desulfurization percentage after 4–6 hours, is favorably affected in the percentage of sodium carbonate varying from 25–50% by weight.

Demethylation of the xylenes, as determined by GLC analysis of the liquid products, was very low under the conditions applied. For example, with the most active catalyst, in experiment No. 5, the toluene content was only 3.8% at run hour 10–12, compared to 1.3% in the feed.

EXAMPLE II

In the same manner as described in Example I, experiments were made with the Co—Mo catalyst in which 50% by weight of lithium carbonate was now incorporated. The results of the experiments were now as follows:

*Table II*

EFFECT OF LITHIUM CARBONATE ON ACTIVITY AND STABILITY OF COBALT MOLYBDATE DESULFURIZATION CATALYST

| Experiment No. | Catalyst Composition, parts by wt. | | | Percent Desulfurization | |
|---|---|---|---|---|---|
| | Co-Mo-Al$_2$O$_3$ | Lithium Carbonate | Potassium Carbonate | After 4–6 hrs. | After 22–24 hrs. |
| 8 | 100 | | | 85 | 54 |
| 9 | 50 | 50 | | 91 | 95 |
| 10 | 75 | | a 25 | 97 | 97 |
| 11 | 75 | | b 25 | 85 | 76 | a 30–50 mesh particles.
b Less than 40 mesh particles.

These experiments show that as a result of the use of 50% by weight of lithium carbonate a remarkably stable catalyst was obtained which even exhibited an increased desulfurization activity after 22–24 hours. Moreover, the activity of this catalyst was higher than that of the Co—Mo catalyst as such, this being reflected in the desulfurization percentage of the catalyst after 4–6 hours, viz. 85 as against 91. The potassium carbonate catalyst was of equal or higher activity.

EXAMPLE III

Co—Mo catalysts containing mixtures of alkali carbonates were prepared and calcined in the same manner as described in Example I. The sulfiding was carried out by contact with a mixture of hydrogen and hydrogen sulfide containing 10% by volume of hydrogen sulfide, at a pressure of 10 atm. abs. and at gradually increasing temperatures from room temperature to 375° C. The sulfiding procedure, which took 4 hours, was carried out in the same reactor as used for the desulfurization of the sulfur-containing hydrocarbon oil.

Desulfurization experiments were carried out with the base Co—Mo—Al$_2$O$_3$ catalyst as used in Example I and with this catalyst containing 25% by weight of carbonate in the form of mixtures of equal amounts of Na$_2$CO$_3$—K$_2$CO$_3$, Li$_2$CO$_3$—K$_2$CO$_3$ and Li$_2$CO$_3$—Na$_2$CO$_3$ respectively.

A vaporized mixture of thiophene and xylene containing 4.5% by weight of sulfur was passed over the catalysts, together with steam. The products were collected and analyzed for their sulfur contents. Test conditions were:

Pressure _____ 20 atm. abs.
Temperature _____ 400° C.
L.H.S.V. _____ 0.88 kg. liquid feed per liter catalyst per hour.
Steam/feed ratio _____ 0.2 kg. steam per liter liquid feed (9 gram mols H$_2$O per gram atom S).

*Table III*

| Ex. No. | Catalyst Composition, parts by wt. | | | Percent Desulfurization | |
|---|---|---|---|---|---|
| | Co-Mo-Al$_2$O$_3$ | Carbonates | | After 4–6 hours | After 22–24 hours |
| 12 | 100 | | | 62 | 33 |
| 13 | 75 | 12,5Na$_2$CO$_3$ | 12,5K$_2$CO$_3$ | 84 | 77 |
| 14 | 75 | 12,5Li$_2$CO$_3$ | 12,5K$_2$CO$_3$ | 78 | 83 |
| 15 | 75 | 12,5Li$_2$CO$_3$ | 12,5Na$_2$CO$_3$ | 73 | 73 |

In view of the higher space velocity applied in the above experiments, the data in Table III are not strictly comparable to those in Tables I and II. The experiments, however, do show that mixtures of alkali carbonates are as effective as the single carbonates in improving the activity and the stability of the Co—Mo—Al$_2$O$_3$ catalyst.

EXAMPLE IV

A Kuwait straight-run kerosene having the properties shown in Table IV was desulfurized at a temperature of 400° C. and a pressure of approximately 70 atms.

*Table IV*

PROPERTIES OF KUWAIT STRAIGHT-RUN KEROSENE

Sulfur, percent w. _____ 0.24
Specific gravity, $d_4^{20}$ _____ 0.7851
Bromine number, g./100 g. _____ <1
Smoke point, mm. _____ 26
ASTM distillation, ° C.:
   IBP _____ 157
   10% at _____ 175
   20% at _____ 180
   30% at _____ 185
   40% at _____ 189
   50% at _____ 194
   90% at _____ 221
   95% at _____ 232
   FBP _____ 245

*Table IV—Continued*

ASTM distillation, ° C.:—Continued
  FIA analysis—
    Aromatics _____ 17.6
    Olefins _____ 2.2
    Saturates _____ 80.2

The catalysts were a commercial cobalt molybdenum catalyst containing 3.6% w. CoO and 12.6% w. $MoO_3$ on $Al_2O_3$, and an experimental catalyst obtained by repelleting a powdered mixture of the commercial catalyst with 25% w. of anhydrous sodium carbonate. The catalysts were presulfided prior to use in the manner described in Example III. The liquid hourly space velocity was 0.39 liter of kerosene per liter of catalyst per hour and the ratio of water vapor to oil was 0.2 kg. per liter (190 gram mols per gram atom S). The percent desulfurization is shown in Table V. The increased stability of the sodium carbonate catalyst is clearly indicated.

*Table V*

DESULFURIZATION OF KUWAIT STRAIGHT-RUN KEROSENE

| After Hours | Percent Desulfurized | |
|---|---|---|
| | $Co/Mo/Al_2O_3$ | $Co/Mo/Al_2O_3/Na_2CO_3$ |
| 0–2 | 71 | 58 |
| 4–6 | 83 | 87 |
| 10–12 | 87 | 83 |
| 16–18 | 83 | 83 |
| 22–24 | 83 | 83 |
| 46–48 | 83 | 83 |
| 70–72 | 79 | 83 |
| 94–96 | 79 | 83 |
| 120–122 | 75 | 79 |
| 144–146 | 71 | 83 |
| 168–170 | 71 | 79 |
| 192–194 | 67 | 79 |
| Catalyst weight increase, percent w. of fresh catalyst | 14 | 3.5 |
| Experiment No | 16 | 17 |

EXAMPLE V

Catalyst pellets were prepared by mixing powders of three different particle sizes of the same $Co—Mo—Al_2O_3$ catalyst as was used in Example I, together with similarly powdered anhydrous lithium carbonate in the ratio of 75% by weight of $Co—Mo—Al_2O_3$ catalyst and 25% by weight of $Li_2CO_3$. Pellets were made in 3 x 3 mm. size and calcined for 3 hours at 500° C. in the presence of air. After having been sulfided, the three catalysts were tested in exactly the same way as described in Example III. Again the feed was a mixture of thiophene and xylene, containing 4.5% by weight of sulfur. The results were as follows:

*Table VI*

DESULFURIZATION WITH VARYING PARTICLE SIZE LITHIUM CARBONATE

| Experiment No. | Particle size of powder used in pelleting (ASTM Standard Sieves) | Percent Desulfurization | |
|---|---|---|---|
| | | After 4–6 hours | After 22–24 hours |
| 18 | 30–50 mesh | 60 | 60 |
| 19 | smaller than 40 mesh | 74 | 84 |
| 20 | 100–200 mesh | 84 | 87 |

EXAMPLE VI

In the previous examples, desulfurization experiments were carried out with catalysts containing $$Co—Mo—Al_2O_3$$

and alkali carbonate in a composite pellet. In the present example it is shown that instead of these composite pellets, catalysts may be used consisting of a mixture of $Co—Mo—Al_2O_3$ particles and separate particles of alkali carbonate or of particles containing alkali carbonate and another material, e.g. alumina.

The following experiments were carried out:

(a) A reactor was filled with 75 grams of $$Co—Mo—Al_2O_3$$

particles (40–80 mesh) mixed with 25 grams of $Li_2CO_3$ particles (smaller than 200 mesh). After sulfiding with a $H_2S—H_2$ mixture containing 10% vol. of $H_2S$, a test was carried out under the same conditions as described in Example III, using again a thiophene/xylene mixture (4.5% by weight of sulfur) as the feed.

(b) After 24 hours of testing the reactor was cooled down and the $Co—Mo—Al_2O_3$ particles separated from the $Li_2CO_3$ particles by sieving. The $Co—Mo—Al_2O_3$ particles were recharged to the reactor and again tested for 24 hours, after resulfiding in the above manner and using thiophene/xylene as the feed.

(c) Again after 24 hours the test was interrupted and a fresh portion of 25 grams of $Li_2CO_3$ (<200 mesh) was added to and mixed with the $Co—Mo—Al_2O_3$ particles. The test was resumed after sulfiding in the above manner.

The desulfurization results listed in Table VII show that:

(1) It is not necessary to combine $Co—Mo—Al_2O_3$ with $Li_2CO_3$ in one composite pellet to obtain the stabilizing effect of $Li_2CO_3$.
(2) Removal of $Li_2CO_3$ immediately leads to a decline in activity of the sulfided $Co—Mo—Al_2O_3$ catalyst.
(3) Addition of fresh $Li_2CO_3$ to the deactivated $$Co—Mo—Al_2O_3$$

particles partially restores their activity.

In another experiment (No. 24) the reactor was charged with a mixture of powdered $Co—Mo—Al_2O_3$ catalyst (100–200 mesh particles) and of particles (100–200 mesh) consisting of a mixture of $Al_2O_3$ and anhydrous $Na_2CO_3$. These latter particles were prepared by pelleting a mixture of powdered $Al_2O_3$ and anhydrous $Na_2CO_3$ followed by crushing and recovering the desired fraction by sieving.

The data in Table VII show that the addition of sodium carbonate in the form of particles containing $Na_2CO_3$ and $Al_2O_3$ resulted in the stabilization of the $Co—Mo—Al_2O_3$ catalyst.

*Table VII*

Test conditions:
  Pressure _____ 20 atm. abs.
  Temperature _____ 400° C.
  L.H.S.V. _____ 0.44 kg. per liter per hour.
  Steam/feed ratio _____ 0.2 kg. per liter (9 gram mols $H_2O$ per gram atom S).

Feed: Mixture of thiophene and xylene, containing 4.5% by weight of sulfur.
Catalyst composition and pretreatment: $Co—Mo—Al_2O_3$ from commercial source (ca. 3.6% by weight of CoO, ca. 12.6% by weight of $MoO_3$). Before each experiment the reactor content was sulfided according to the procedure described in Example III.

| Experiment No. | Catalytic Material Present in the Reactor | Percent Desulfurization | |
|---|---|---|---|
| | | After 4–6 hours | After 22–24 hours |
| 21 | Mixture of 75 g. Co-Mo-$Al_2O_3$ catalyst (40–80 mesh) and 25 g. of powdered $Li_2CO_3$ (<200 mesh). | 96 | 97 |
| 22 | The Co-Mo-$Al_2O_3$ fraction from the previous test after removing the $Li_2CO_3$ fraction by sieving. | 82 | 66 |
| 23 | The Co-Mo-$Al_2O_3$ fraction from the previous test, to which 25 g. of fresh $Li_2CO_3$ (<200 mesh) was added. | 72 | 74 |
| 24 | Mixture of 50% by weight of powdered Co-Mo-$Al_2O_3$ (100–200 mesh) and a powder (100–200 mesh) consisting of 25% by weight of $Al_2O_3$ and 25% by weight of $Na_2CO_3$ previously pressed together and then crushed again. | a 76 | 7 | a After 10–12 hours.

EXAMPLE VI

In order to demonstrate the influence of the calcination temperature in the preparation of the catalysts according to the present invention, the following desulfurization experiments were carried out:

Table VIII

Test conditions:
- Pressure_____ 20 atm. abs.
- Temperature_____ 400° C.
- L.H.S.V_____ 0.44 kg. per liter per hour.
- Steam/feed ratio_____ 0.2 kg. per liter (9 gram mols $H_2O$ per gram atom S).

Feed: Thiophene + xylene, containing 4.5% by weight of sulfur.

Catalyst: 100 ml. of pelleted (3 x 3 mm.) catalyst, consisting of 75% by weight of Co—Mo—$Al_2O_3$ 25% by weight of $Na_2CO_3$ sulfided with a 10% vol. $H_2S$—$H_2$ mixture before use. The original Co—Mo—$Al_2O_3$ component contained 3.6% by weight of CoO and 12.6% by weight of $MoO_3$.

| Experiment No. | Calcination 3 hours in air at— | Percent Desulfurization | |
|---|---|---|---|
| | | After 4-6 hours | After 22-24 hours |
| 25 | not calcined | 96 | 95 |
| 26 | 500° C | 97 | 97 |
| 27 | 650° C | 86 | 87 |

EXAMPLE VII

In order to demonstrate the different nature of desulfurization with free hydrogen and the desulfurization according to the present invention, experiments were carried out with an extruded (1.5 mm. diameter extrudates) Co—Mo—$Al_2O_3$ catalyst containing ca. 3.6% by weight of CoO and 12.6% by weight of $MoO_3$ and with the same catalyst after powdering and repelleting together with 25% by weight of powdered anhydrous $Na_2CO_3$, followed by calcination at 500° C. for 3 hours.

With each type of catalyst a desulfurization experiment was carried out in the presence of added hydrogen, as well as an experiment in the presence of steam. The feed in all cases was a straight-run gas oil (boiling range 250°–375° C. A.S.T.M.) of Middle East origin, containing 1.48% by weight of sulfur.

Table IX

| Test conditions | Experiments with $H_2$ | Experiments with steam |
|---|---|---|
| Pressure | 20 atm. abs. | 70 atm. abs. |
| Temperature | 375° C. | 400° C. |
| L.H.S.V. | 2.5 kg. per liter per hour. | 0.43 kg. per liter per hour. |
| $H_2$/feed ratio | 2000 norm. liter per liter feed. | steam/feed ratio: 0.2 kg. steam (28 gram mols $H_2O$ per gram atom S) per liter feed. |

Note.—All catalysts were sulfided before use in the manner described in Example III.

| Experiment No. | Catalyst | Gas used | Percent Desulfurization | | |
|---|---|---|---|---|---|
| | | | After 4-6 hrs. | After 10-12 hrs. | After 22-24 hrs. |
| 28 | Co-Mo-alumina | $H_2$ | 95 | 93 | 95 |
| 29 | Co-Mo-alumina + 25% by wt. of $Na_2CO_3$ | $H_2$ | 65 | 50 | 41 |
| 30 | Co-Mo-alumina | steam | 77 | 67 | 55 |
| 31 | Co-Mo-alumina + 25% by wt. of $Na_2CO_3$ | do | 80 | 75 | 67 |

Experiment No. 28 exemplifies the well known hydrotreating of oil fractions with added hydrogen; experiment No. 29 shows that for such a hydrogenation process, the catalyst containing an alkali carbonate according to the present invention is unsuitable. On the other hand, the alkali carbonate containing catalyst is better suited for the desulfurization with steam.

EXAMPLE VIII

In order to demonstrate the beneficial influence of increased pressures on the stability of the catalysts according to the present invention desulfurization experiments were carried out with a straight-run heavy gas oil (boiling range 250° C.–375° C. A.S.T.M.) of Middle East origin. This gas oil was passed together with steam over sulfided Co—Mo—$Al_2O_3$ catalyst (3 x 3 mm. pellets, base catalyst as in Example III) containing 25% by weight of $Na_2CO_3$ or $Li_2CO_3$ under conditions as given in Table X. In all cases the space velocity was 0.43 kg. per liter per hour.

Table X

| Experiment No. | Catalyst | Conditions | | | S-Content of feed percent by weight | Percent desulfurization | |
|---|---|---|---|---|---|---|---|
| | | Pressure, atm. abs. | Temp., °C. | Steam/oil, kg./liter | | After 4-6 hours | After 22-24 hours |
| 32 | Co-Mo-$Al_2O_3$ + 25% by wt. of $Na_2CO_3$ | 20 | 400 | 0.2 | 1.48 | 50 | 13 |
| 33 | Co-Mo-$Al_2O_3$ + 25% by wt. of $Na_2CO_3$ | 70 | 400 | 0.2 | 1.48 | 50 | 46 |
| 34 | Co-Mo-$Al_2O_3$ + 25% by wt. of $Li_2CO_3$ | 40 | 400 | 0.2 | 1.48 | 69 | 47 |
| 35 | Co-Mo-$Al_2O_3$ + 25% by wt. of $Li_2CO_3$ | 70 | 400 | 0.2 | 1.48 | 80 | 66 |
| 36 | Co-Mo-$Al_2O_3$ + 25% w. $Li_2CO_3$ | 70 | 375 | 0.1 | 1.35 | 55 | 47 |
| 37 | Co-Mo-$Al_2O_3$ + 25% w. $Li_2CO_3$ | 100 | 375 | 0.1 | 1.35 | 56 | 53 |

In Table X three series of experiments are shown, each comprising an experiment at a lower and a higher pressure. In each series it appears that the higher pressures have a beneficial effect on catalyst stability. Since the series differ in catalyst composition or reaction conditions the data also show that the effect of pressure is a general one.

We claim as our invention:

1. A process for the catalytic desulfurization of sulfur-containing hydrocarbon oils which comprises contacting said hydrocarbon oils with a catalyst comprising at least one sulfide of an element of the left-hand column of group VI of the periodic table, and at least one sulfide of an element of the iron group of metals in group VIII of the periodic table, said sulfides being supported on an alumina carrier, and from 10% to about 80% by weight, based on the total catalyst, of an alkali metal carbonate, said contacting being in the presence of water vapor at a temperature in the range from 250° C. to 450° C.

2. A process for the catalytic desulfurization of sulfur-containing hydrocarbon oils which comprises contacting said hydrocarbon oils with a catalyst comprising at least one sulfide of an element of the left-hand column of group VI of the periodic table, and at least one sulfide of an element of the iron group of metals in group VIII of the periodic table, said sulfides being supported on an alumina carrier, and from 10% to about 80% by weight, based on the total catalyst, of an alkali metal carbonate, said contacting being carried out at a temperature in the range from 325° C. to 425° C., a pressure in the range from 20 atmospheres to 100 atmospheres absolute, and in the presence of water vapor in an amount to provide from about 5 to about 250 mols of water vapor per gram atom of sulfur.

3. A process according to claim 2 wherein the alkali metal carbonate is sodium carbonate.

4. A process according to claim 2 wherein the alkali metal carbonate is lithium carbonate.

5. A process according to claim 2 wherein the alkali metal carbonate is potassium carbonate having a particle size no smaller than about 30–50 mesh.

6. A process for the catalytic desulfurization of sulfur-containing hydrocarbon oils which comprises contacting said hydrocarbon oils with a catalyst comprising cobalt sulfide and molybdenum sulfide supported on a carrier containing at least 90% by weight alumina, and having incorporated therein from 10% to 80% by weight, based on the total catalyst, of an alkali metal carbonate, said contacting being in the presence of water vapor at a temperature in the range from 250° C. to 450° C., and a pressure of from 50 to 75 atmospheres absolute.

7. A process according to claim 6 wherein the alkali metal carbonate is sodium carbonate and is incorporated in the catalyst in an amount from about 20% to about 40% by weight, based on the total catalyst.

8. A process for the catalytic desulfurization of sulfur-containing hydrocarbon oils which comprises contacting said hydrocarbon oils with a catalyst comprising cobalt sulfide and molybdenum sulfide supported on a carrier containing at least 90% by weight alumina, and having incorporated therein from 10% to 80% by weight, based on the total catalyst, of an alkali metal carbonate, said contacting being carried out at a temperature in the range from 325° C. to 425° C., a pressure in the range from 20 atmospheres to 100 atmospheres absolute, a liquid hourly space velocity of from 0.25 to 4 kilograms of oil per liter of catalyst per hour and in the presence of water vapor in an amount to provide from 5 to about 250 mols of water vapor per gram atom of sulfur.

9. A process according to claim 8 wherein the alkali metal carbonate is sodium carbonate.

10. A process according to claim 8 wherein the alkali metal carbonate is lithium carbonate.

References Cited in the file of this patent
UNITED STATES PATENTS

| | | |
|---|---|---|
| 2,642,381 | Dickinson | June 16, 1953 |
| 2,773,011 | Haensel | Dec. 4, 1956 |
| 2,901,423 | Herbert et al. | Aug. 25, 1959 |